United States Patent
Hedayat et al.

(10) Patent No.: US 7,778,211 B2
(45) Date of Patent: Aug. 17, 2010

(54) METHOD FOR COMPUTING A DOWNLINK BEAMFORMING WEIGHTING VECTOR BASED ON UP LINK CHANNEL INFORMATION

(75) Inventors: Ahmadreza Hedayat, Allen, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 665 days.

(21) Appl. No.: 11/711,443

(22) Filed: Feb. 26, 2007

(65) Prior Publication Data

US 2008/0076477 A1 Mar. 27, 2008

Related U.S. Application Data

(60) Provisional application No. 60/847,181, filed on Sep. 26, 2006.

(51) Int. Cl.
*H04B 7/00* (2006.01)

(52) U.S. Cl. .................................................... 370/310

(58) Field of Classification Search ................ 370/321, 370/334, 310; 455/432.2, 447, 450, 168.1
See application file for complete search history.

(56) References Cited

U.S. PATENT DOCUMENTS

| 6,477,161 | B1 * | 11/2002 | Hudson et al. ............... 370/342 |
| 6,694,155 | B1 * | 2/2004 | Chin et al. ................ 455/562.1 |
| 6,839,574 | B2 * | 1/2005 | Petrus et al. .............. 455/562.1 |
| 6,980,527 | B1 * | 12/2005 | Liu et al. ..................... 370/280 |
| 7,095,987 | B2 * | 8/2006 | Brothers et al. ............. 455/101 |
| 7,359,733 | B2 * | 4/2008 | Liang et al. .............. 455/562.1 |
| 7,444,170 | B2 * | 10/2008 | Karabinis ................ 455/562.1 |
| 7,536,205 | B2 * | 5/2009 | Van Rensburg et al. .. 455/562.1 |
| 7,551,682 | B2 * | 6/2009 | Na et al. ...................... 375/267 |
| 7,567,583 | B2 * | 7/2009 | Miyoshi ...................... 370/465 |
| 2003/0026348 | A1 | 2/2003 | Llang et al. ................. 375/267 |
| 2004/0071222 | A1 * | 4/2004 | Liang et al. ................. 375/267 |
| 2004/0082356 | A1 | 4/2004 | Walton et al. ............... 455/522 |
| 2004/0146024 | A1 | 7/2004 | Li et al. ...................... 370/334 |
| 2004/0235529 | A1 * | 11/2004 | Tarokh et al. ............ 455/562.1 |
| 2006/0025079 | A1 * | 2/2006 | Sutskover et al. ........ 455/67.11 |

* cited by examiner

*Primary Examiner*—Lester Kincaid
*Assistant Examiner*—Nathan Mitchell

(57) ABSTRACT

Described herein is a method for obtaining a downlink beamforming weighting vector in a wireless communications system based on channel information about an uplink channel. The method comprises obtaining the channel information about the uplink channel by a means selected from the group comprising of training signals, pilot signals, and data signals, wherein the uplink channel comprises a set of uplink sub-channels, calculating a spatial signature of the uplink channel with the channel information, and computing a downlink beamforming weighting vector of a downlink channel with the spatial signature of the uplink channel, wherein the downlink channel comprises a set of downlink sub-channels that share few or no sub-carriers with the set of uplink sub-channels.

14 Claims, 4 Drawing Sheets

METHOD FOR COMPUTING A DOWNLINK BEAMFORMING WEIGHTING VECTOR BASED ON UP LINK CHANNEL INFORMATION

CROSS REFERENCE

The present application claims the benefit of U.S. Provisional Application Ser. 60/847,181, which was filed on Sep. 26, 2006.

BACKGROUND

The computation of a downlink (DL) beamforming weighting vector is based on channel information in the downlink direction. In a time division duplex (TDD) system, the channel information in the downlink direction becomes available as long as the uplink (UL) channel information is known. This is true due to the reciprocal nature of the DL and UL TDD channels. However, in a frequency division duplex (FDD) system, this kind of reciprocal characteristic does not exist between the DL and UL channels. As a result, the information about the DL channel must be sent back to a base transceiver station (BTS) explicitly by a mobile station (MS).

In orthogonal frequency division multiplexing (OFDM) and orthogonal frequency division multiple-access (OFDMA) systems, the carriers of OFDM symbols may experience different levels of impairment. Whenever there is a significant change in the channel quality of a sub-carrier, the MS must send channel information back to the BTS explicitly.

In a TDD OFDMA system, the frequency separation between the DL and UL channels might vary from a fraction of a MHz to a few MHz. This is due to the fact that the BTS scheduler assigns a sub-carrier (frequency) to the DL and UL channels dynamically.

For example, in the TDD version of IEEE 802.16 d/e (WiMax) standard, the DL and UL channels both operate in one of the following frequency bands, i.e., 2.5 MHz, 5 MHz, 10 MHz and 20 MHz. The DL channel is divided into sub-carries, any number of which could form a sub-channel. A permutation is designed to minimize the probability of reusing the sub-carriers in adjacent cells.

Depending on which permutation is used, the DL and UL channels may have few or no sub-carriers in common. FIG. 1 is a diagram illustrating an arbitrary assignment of sub-carriers in the UL and DL channels in a two-dimension diagram of time and frequency domains.

In FIG. 1, a radio channel is divided into 24 sub-carriers 110, each of which is represented by an empty block. Nine of the 24 sub-carriers are assigned to a BTS in a cell for downlink traffic. The nine sub-carries are grouped into six sub-channels 120, each of which is represented by a block with dots. Six of the 24 sub-carriers are assigned to an MS for uplink traffic. The six sub-carries are grouped into five sub-channels 130, each of which is represented by a block with horizontal lines. Each of the sub-channels is composed of one or more sub-carriers.

Although the frequency separation between the UL and the DL channels is small, the BTS cannot use UL channel information to estimate the DL channel condition with the traditional methods.

As such, what is desired is a method for computing a DL beamforming weighting vector based on UL channel information in a TDD OFDMA system where there is little or no overlap between the sub-carriers in the UL and the DL channels.

SUMMARY

The subject matter described herein relates to a method for obtaining a downlink beamforming weighting vector in a wireless communications system based on channel information about an uplink channel. The method comprises obtaining the channel information about the uplink channel by a means selected from the group comprising training signals, pilot signals, and data signals, wherein the uplink channel comprises a set of uplink sub-channels, calculating a spatial signature of the uplink channel with the channel information, and computing a downlink beamforming weighting vector of a downlink channel with the spatial signature of the uplink channel, wherein the downlink channel comprises a set of downlink sub-channels that share few or no sub-carriers with the set of uplink sub-channels.

DESCRIPTION

The following detailed description of the invention refers to the accompanying drawings. The description includes exemplary embodiments, not excluding other embodiments, and changes may be made to the embodiments described without departing from the spirit and scope of the invention. The following detailed description does not limit the invention. Instead, the scope of the invention is defined by the appended claims.

The subject matter described herein relates to a method for computing a downlink (DL) beamforming weighting vector in a time division duplex (TDD) orthogonal frequency division multiple-access (OFDMA) system without requiring a mobile station (MS) to send DL channel information to a base transceiver station (BTS) explicitly. The DL beamforming weighting vector is computed by using uplink (UL) channel information even when the UL and the DL channels share few or no sub-carriers. It is known to a person with skills in the art that in a situation where some sub-carriers are used for both UL and DL traffic, the complex conjugate of the UL channel coefficient (possibly scaled with a complex number) provides an optimal DL beamforming weighting vector.

In different scenarios, DL beamforming weighting vectors might be computed using a more complex function than the one described above. Regardless of which function is used, the UL channel coefficients play a major role.

Assume that one UL channel is divided into S sub-channels $\{f_1\ f_2\ \ldots\ f_S\}$, each of which is composed of a number of sub-carriers. The Partially Used Subchannelization (PUSC) permutation in IEEE 802.16 e/d (WiMax) is one example of a sub-carrier assignment.

A channel impulse response function is defined by the following equation:

$$h(t) = a_1\delta(t-\tau_1) + a_2\delta(t-\tau_2) + \ldots + a_M\delta(t-\tau_M) = \sum_{i=1}^{M} a_i\delta(t-\tau_i),$$

where $\tau_i$ is the delay time of the i-th multi-path component and $a_i$, a complex number, is the amplitude of the i-th multi-path component. The channel impulse response function h(t) includes all multi-path components with non-zero energy up to the delay time $\tau_M$.

For example, a channel might have six multi-path components with the largest delay time equal to 14 times of the sampling rate, i.e., $\tau_M$=14. The channel impulse response function h(t) has six terms, each of which corresponds to a multi-path component, and the amplitudes $a_i$ of the remaining eight terms are set to zero. The delay time of a multi-path component is a multiple of the sampling interval. If the delay time is not an integer, it is mapped to the next integer that is a multiple of the sampling interval.

Figure 1:
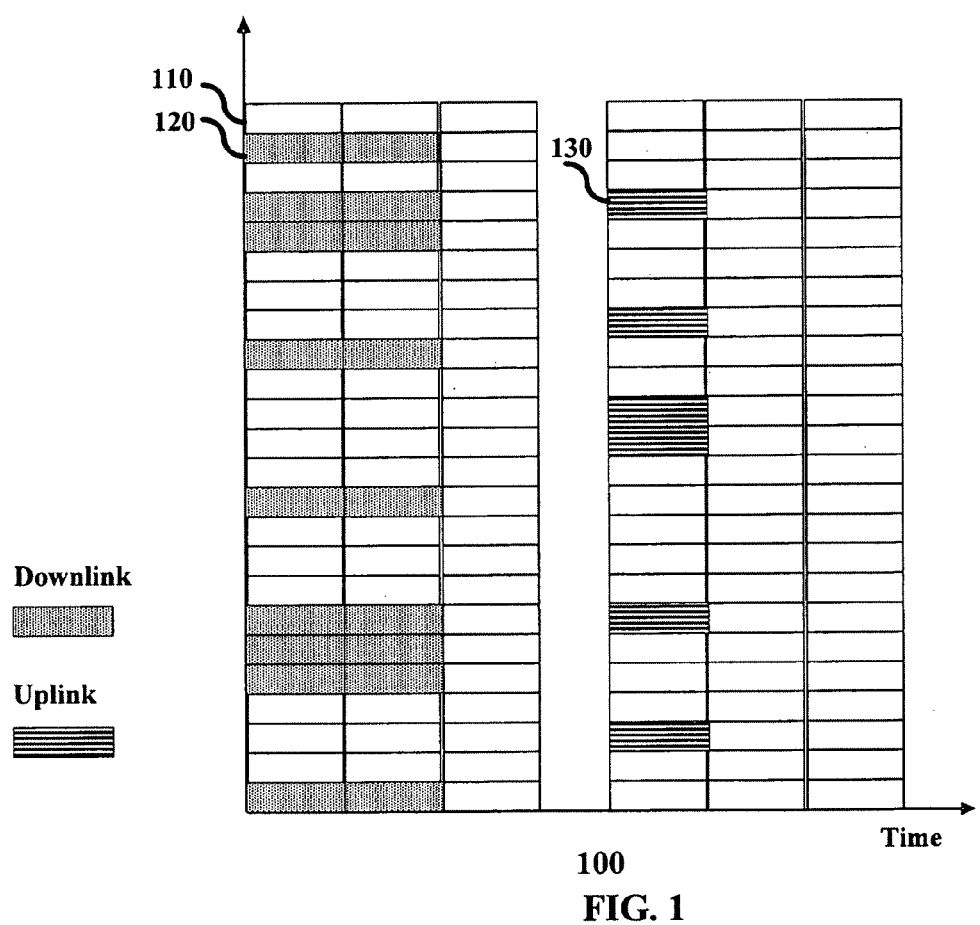
FIG. 1 is a diagram illustrating an arbitrary assignment of sub-carriers in the UL and DL channels.
Figure 2:
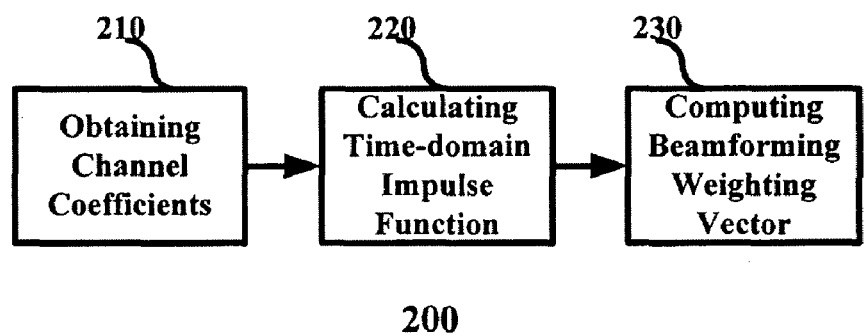
FIG. 2 is a flow diagram illustrating a method for computing a downlink beamforming weighting vector by using time-domain channel impulse response function.

FIG. 2 is a flow diagram illustrating a method for computing a DL beamforming weighting vector in accordance with one embodiment. This method is used to calculate a DL beamforming weighting vector when the S sub-channels $\{f_1 f_2 \ldots f_S\}$ in the UL channel are spread over the entire frequency band of a radio channel, and the S is large enough, compared with the number of the multi-path components.

In step 210, the UL channel coefficients are obtained from a covariance method or other conventional approaches, using training signals, pilot signals, or data signals.

In step 220, by using the UL sub-carrier channel coefficients, the coefficients of the time-domain channel impulse response function h(t) are calculated based on a relationship between the frequency-domain channel coefficients and the time-domain channel impulse response function h(t). This relationship is represented by the following matrix equation:

$$\begin{pmatrix} r_{g_1} \\ r_{g_2} \\ \vdots \\ r_{g_W} \end{pmatrix} = \begin{pmatrix} 1 & \exp\left(-j2\pi\frac{g_1}{F}\right) & \exp\left(-j2\pi\frac{2g_1}{F}\right) & \cdots & \exp\left(-j2\pi\frac{(M-1)g_1}{F}\right) \\ 1 & \exp\left(-j2\pi\frac{g_2}{F}\right) & \exp\left(-j2\pi\frac{2g_2}{F}\right) & \cdots & \exp\left(-j2\pi\frac{(M-1)g_2}{F}\right) \\ \vdots & \vdots & \vdots & & \vdots \\ 1 & \exp\left(-j2\pi\frac{g_W}{F}\right) & \exp\left(-j2\pi\frac{g_W}{F}\right) & \cdots & \exp\left(-j2\pi\frac{(M-1)g_W}{F}\right) \end{pmatrix} \begin{pmatrix} a_1 \\ a_2 \\ \vdots \\ a_M \end{pmatrix},$$

where $r_{g_i}$ is the receiving signal on frequency $g_i$, of a sub-carrier and F is the size of the Fast Fourier Transform (FFT) of an OFDMA system.

Depending on the structure and distribution of S disjoint sub-channels $\{f_1 f_2 \ldots f_S\}$, it is advantageous to combine predetermined neighboring sub-carriers to form a more reliable set of W disjoint sub-channels $\{g_1 g_2 \ldots g_W\}$.

If the S disjoint sub-channels $\{f_1 f_2 \ldots f_S\}$ are well dispersed, then a set of W disjoint sub-channels $\{g_1 g_2 \ldots g_W\}$ is the same as a set of $\{f_1 f_2 \ldots f_S\}$. In other words, S equals W.

However, if two or more sub-channels $f_i\{f_1 f_2 \ldots f_S\}$ are comprised of a set of adjacent sub-carriers, it might be beneficial to compute the average of the receiving signals of the set of adjacent sub-carriers and assign the average signal to one sub-channel denoted by $g_i$. By doing so, the number of sub-channels is reduced and W<=S.

The equation described above represents Fast Fourier Transform (FFT) operation on the channel impulse response function h(t) of the W disjoint sub-channels $\{g_1 g_2 \ldots g_W\}$ in the UL channel. The equation can be solved by using matrix operations such as the inverse or pseudo-inverse of the matrix shown described above in connection with step 220, or by using estimation techniques such as the maximum likelihood, the minimum mean squares error, or the maximum a posteriori method.

In step 230, after determining the time-domain channel impulse response function h(t) for each of the antennas in the antenna array based on the above equation, the frequency response of the channel can be obtained by taking the FFT of h(t). Subsequently, the spatial signature of a channel is obtained and a DL beamforming weighting vector is calculated.

Since the BTS has no prior knowledge about the actual maximum multi-path delay, the BTS might assume that the maximum multi-path delay M is equal to W. If the maximum multi-path delay M is larger than W, the time-domain channel impulse response function h(t), obtained based on the above equation, may differ from the actual channel impulse response. The difference between the time-domain channel impulse response function h(t) and the actual channel impulse response depends on the signal strength of the multi-path components with delay time larger than M times the sampling rate. The beamforming weighting vector is computed according to the approximated time-domain channel impulse response function h(t).

Figure 3:
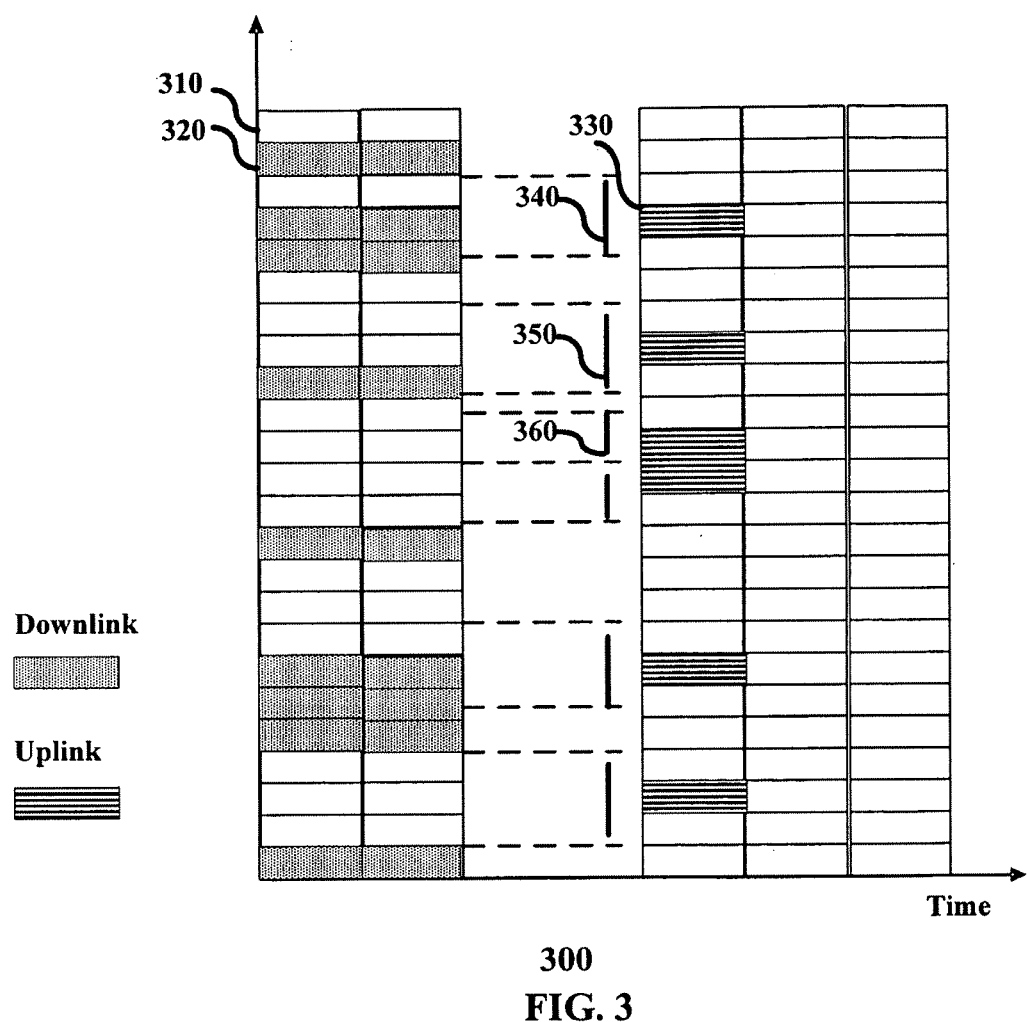
FIG. 3 illustrates neighborhoods of one or more UL sub-channels.

FIG. 3 illustrates a neighborhood 340 of a UL channel 330. For a sub-channel 330 in a set of S disjoint sub-channels $\{f_1 f_2 \ldots f_S\}$ in the UL channel, its neighborhood 340 is composed of a predetermined number of sub-carriers $f_N$.

The relationship between the UL sub-channel 330 and the DL sub-channel 320 is illustrated by dashed lines drawn from the UL sub-channel 330 to the DL sub-channel 320 in FIG. 3.

If the neighborhood of one UL sub-channel 350 overlaps with that of another UL sub-channel 360, the neighborhood could be redefined as an asymmetric neighborhood but it is still based on the center of the UL sub-channel to resolve ambiguity.

Figure 4:
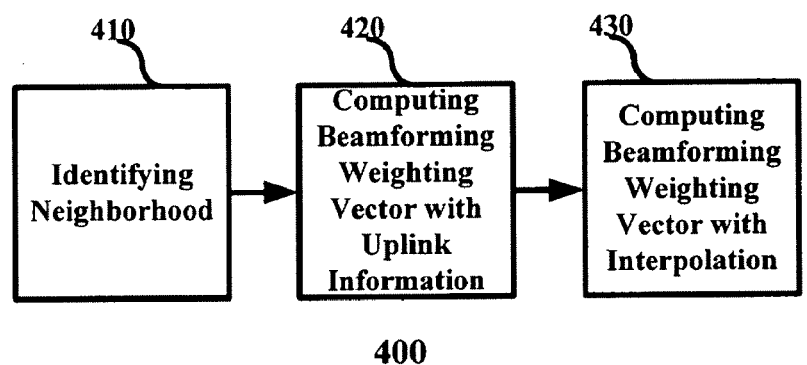
FIG. 4 is a flow diagram illustrating a method for computing a downlink beamforming weighting vector by selective interpolation or extrapolation.

FIG. 4 is a flow diagram illustrating a method for computing a DL beamforming weighting vector by selective interpolation or extrapolation.

In step 410, a BTS identifies the neighborhood of one UL channel, as illustrated in FIG. 3.

In step 420, the DL sub-carriers that fall within any of the neighborhoods of the UL sub-channels are identified. A DL beamforming weighting vector is obtained by using the DL sub-carrier channel information.

In step 430, the DL sub-carriers that fall outside the neighborhoods of the UL sub-channels are determined. Interpolation or extrapolation techniques (either linear or non-linear, depending on the tradeoff between complexity and performance) are used to calculate a DL beamforming weighting vector based on the channel information, about the immediate neighboring UL sub-channels.

The above description is intended by way of example only.

What is claimed is:

1. A method comprising:
   receiving at a plurality of antennas of an antenna array of a base station an uplink transmission that is transmitted from a mobile station, wherein the uplink transmission is transmitted in an uplink channel that comprises a plurality of sub-channels, each of which comprises a plurality of subcarriers;

computing uplink channel coefficients for the uplink channel from the received uplink transmission at the base station;

computing for each antenna in the antenna array of the base station, one or more coefficients for a time-domain channel impulse response function from the uplink channel coefficients;

computing a frequency response of the uplink channel from the time-domain channel impulse response function for each antenna;

calculating a spatial signature of the uplink channel from the frequency response; and computing a downlink beamforming weighting vector for use when making a downlink transmission via the antenna array of the base station on a downlink channel to the mobile station from the spatial signature of the uplink channel, wherein the downlink channel comprises a plurality of downlink sub-channels that share few or no frequency sub-carriers with the plurality of uplink sub-channels.

2. The method of claim 1, wherein computing the frequency response of the uplink channel comprises computing a Fast Fourier Transform of the time-domain channel impulse response function for each antenna described by the one or more coefficients for a pre-determined number of sub-channels of a frequency band in which the uplink channel and downlink channel reside.

3. The method of claim 2, wherein computing the uplink channel coefficients uses covariance method based on the uplink transmission received at the plurality of antennas; and computing the one or more coefficients of the time-domain channel impulse response function for each antenna from the uplink channel coefficients according to a pre-determined equation.

4. The method of claim 3, wherein computing the one or more coefficients of the time-domain channel impulse response function comprises computing the one or more coefficients according to the predetermined equation defined as:

$$\begin{pmatrix} r_{g_1} \\ r_{g_2} \\ \vdots \\ r_{g_W} \end{pmatrix} = \begin{pmatrix} 1 & \exp\left(-j2\pi\frac{g_1}{F}\right) & \exp\left(-j2\pi\frac{2g_1}{F}\right) & \cdots & \exp\left(-j2\pi\frac{(M-1)g_1}{F}\right) \\ 1 & \exp\left(-j2\pi\frac{g_2}{F}\right) & \exp\left(-j2\pi\frac{2g_2}{F}\right) & \cdots & \exp\left(-j2\pi\frac{(M-1)g_2}{F}\right) \\ \vdots & \vdots & \vdots & & \vdots \\ 1 & \exp\left(-j2\pi\frac{g_W}{F}\right) & \exp\left(-j2\pi\frac{g_W}{F}\right) & \cdots & \exp\left(-j2\pi\frac{(M-1)g_W}{F}\right) \end{pmatrix} \begin{pmatrix} a_1 \\ a_2 \\ \vdots \\ a_M \end{pmatrix},$$

where $r_{g_i}$ is a received signal at a given antenna at frequency $g_i$, $F$ is the size of the Fast Fourier Transform (FFT) and $a_i$ is the coefficient of an i-th multi-path component of the time-domain channel impulse response function at the given antenna.

5. The method of claim 4, wherein computing the one or more coefficients of the time-domain channel impulse response function comprises computing a solution to the predetermined equation using by matrix operations comprising at least one of inverse and pseudo-inverse matrix operations.

6. The method of claim 4, wherein computing the one or more coefficients of the time-domain channel impulse response function comprises computing a solution to the predetermined equation using by estimation techniques comprising at least one of a maximum likelihood method, a minimum mean square error method, and a maximum a posteriori method.

7. A method comprising:

receiving at a plurality of antennas of an antenna array of a base station an uplink transmission that is transmitted from a mobile station, wherein the uplink transmission is transmitted in an uplink channel that comprises a plurality of sub-channels, each of which is composed of a plurality of subcarriers;

computing uplink channel coefficients for the uplink channel from the received uplink transmission at the base station;

calculating a spatial signature of the uplink channel from the uplink channel coefficients; and computing a downlink beamforming weighting vector for use when making a downlink transmission via the antenna array of the base station in a downlink channel to the mobile station from the spatial signature of the uplink channel, wherein the downlink channel comprises a set of downlink sub-channels of frequency sub-carriers that fall within neighborhoods of one or more uplink sub-channels of frequency subcarriers.

8. The method of claim 7, wherein computing the downlink beamforming weight vector comprises computing the downlink beamforming weight vector such that a predetermined uplink sub-channel is at a center of the neighborhood.

9. The method of claim 8, wherein computing the downlink beamforming weight vector comprises computing the downlink beamforming weight vector such that the neighborhood of one or more frequency subcarriers in an uplink sub-channel overlaps with the neighborhood of one or more frequency subcarriers in another uplink sub-channel.

10. The method of claim 7, wherein computing the downlink beamforming weighting vector comprises:

computing the downlink beamforming weighting vector for the downlink sub-channels from the uplink channel coefficients under the condition that the subcarriers in the downlink sub-channels fall within one or more neighborhoods of the uplink sub-channels; and constructing the downlink beamforming weighting vector for the downlink sub-channels from the uplink channel coefficients with respect to immediate neighborhoods of the uplink sub-channels for the subcarriers in the downlink sub-channels which fall outside one or more neighborhoods with respect to the uplink sub-channels.

11. The method of claim 10, wherein constructing the downlink beamforming weighting vector uses at least one of interpolation and extrapolation based on the immediate neighboring uplink subchannels.

12. The method of claim 3, wherein computing the one or more coefficients of the time-domain channel impulse response function is based on a channel impulse response function of the form $$h(t) = a_1\delta(t-\tau_1) + a_2\delta(t-\tau_2) + \ldots + a_M\delta(t-\tau_M) = \sum_{i=1}^{M} a_i\delta(t-\tau_1),$$

where $\tau_i$ is a delay of the i-th multi-path component and coefficient $a_i$ is a complex number representing an amplitude of the i-th multi-path component.

13. The method of claim 12, wherein computing the one or more coefficients of the time-domain channel impulse response from the uplink channel coefficients is based on a relationship between the frequency response of the uplink channel and the time-domain channel impulse response function h(t).

14. The method of claim 7, and further comprising computing for each antenna in the antenna array of the base station, one or more coefficients for a time-domain channel impulse response function from the uplink channel coefficients; computing a frequency response of the uplink channel from the time-domain channel impulse response function for each antenna described by the one or more coefficients, wherein computing the spatial signature is based on frequency response.

* * * * *